United States Patent
Rosenberg

(10) Patent No.: US 7,654,752 B2
(45) Date of Patent: Feb. 2, 2010

(54) Z-AXIS ALIGNMENT OF AN OPTOELECTRONIC COMPONENT USING A COMPOSITE ADHESIVE

(75) Inventor: Paul K. Rosenberg, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/187,333

(22) Filed: Jul. 22, 2005

(65) Prior Publication Data

US 2006/0018624 A1 Jan. 26, 2006

Related U.S. Application Data

(60) Provisional application No. 60/590,280, filed on Jul. 22, 2004.

(51) Int. Cl.
*G02B 6/02* (2006.01)
*H04B 10/02* (2006.01)

(52) U.S. Cl. .................... 385/93; 398/141; 398/201; 398/214

(58) Field of Classification Search .............. 385/93; 398/141, 200, 201, 212, 214
See application file for complete search history.

(56) References Cited

U.S. PATENT DOCUMENTS 4,752,109 A * 6/1988 Gordon et al. .................. 385/14
5,966,399 A 10/1999 Jiang et al.
6,907,151 B2 * 6/2005 Yunus ............................ 385/14
2005/0105860 A1 * 5/2005 Oono et al. .................... 385/88

OTHER PUBLICATIONS

U.S. Appl. No. 11/537,626, mailed Jun. 5, 2008, Notice of Allowance 15436.420.1.1.
U.S. Appl. No. 11/537,626, mailed Jan. 24, 2008, Non-Final Office Action in 15436.420.1.1.
U.S. Appl. No. 11/537,627, mailed Mar. 13, 2008, Non-Final Office Action in 15436.420.1.2.
U.S. Appl. No. 11/537,627, mailed Oct. 19, 2007, Final Office Action in 15436.420.1.2.
U.S. Appl. No. 11/537,627, mailed Apr. 10, 2007, Non-Final Office Action in 15436.420.1.2.

* cited by examiner

*Primary Examiner*—Jerry T Rahll
(74) *Attorney, Agent, or Firm*—Workman Nydegger

(57) ABSTRACT

An optoelectronic package that employs a spacer tool system to properly align an optical component within the device is disclosed. In one embodiment, the package includes a mounting surface, and an optical component positioned on the mounting surface at a predetermined distance from a reference point. The optical component is positioned at the predetermined distance by a spacer tool, wherein the spacer tool is interposed between the optical component and a spacer tool mount during optical component positioning. The spacer tool is of a length that corresponds with the predetermined distance between the optical component and the reference point.

12 Claims, 4 Drawing Sheets

Z-AXIS ALIGNMENT OF AN OPTOELECTRONIC COMPONENT USING A COMPOSITE ADHESIVE

CROSS-REFERENCE TO RELATED APPLICATIONS

This application claims the benefit of U.S. Provisional Patent Application No. 60/590,280, filed Jul. 22, 2004, which is incorporated herein by reference in its entirety.

BACKGROUND

1. The Field of the Invention

The present invention is generally directed to optoelectronic devices. More particularly, the present invention is directed to the alignment of a component within an optoelectronic device so as to provide for efficient assembly of the device.

2. The Related Technology

Fiber-optics and optoelectronics are important aspects of modern optical networks because they allow for efficient, accurate and rapid transmission of optical data between various components in the network system. Optical transceiver modules ("transceivers") are an example of modular components used in optical networks. Such modular component are desirable in optical networks and other fiber optic systems to reduce the cost of manufacturing the system, which cost increases the more customized the system becomes.

Transceivers usually include an input receiver optical subassembly ("ROSA") and an output transmitter optical subassembly ("TOSA"). The ROSA includes a photodiode for detecting optical signals and sensing circuitry for converting the optical signals to electrical signals compatible with other network components. The TOSA includes a laser for transmitting optical signals and may include control circuitry for modulating the laser according to an input digital data signal as well as a photodetector to monitor laser power. The TOSA has an optical lens for focusing the optical signals from the laser of the TOSA into an optical fiber. Similarly, the ROSA often includes a lens to focus incoming optical signals on the photodiode. Additionally, one end of the transceiver includes pluggable receptacles, pig-tailed connections, or other suitable means for optically connecting the TOSA and the ROSA with other components within a fiber optic network, while another end often includes a connector for connecting with electrical components of a host system or device with which the transceiver communicates.

The photodiode in the ROSA and the laser in the TOSA are examples of optoelectronic semiconductor components. Generally, these optoelectronic semiconductor components are sensitive devices that require mechanical and environmental protection. As such, these optoelectronic components are usually manufactured in packages to provide such protection and to facilitate their incorporation into higher level devices, such as TOSAs and ROSAs.

One such packaging assembly is known as a transistor-outline header or transistor-outline package, referred to herein as a TO package. TO packages are widely used in the field of optoelectronics, and may be employed in a variety of applications. As such, TO packages are often standardized to facilitate their incorporation into components such as transceivers. The TO packages protect the sensitive electrical devices contained therein and electrically connect such devices to external components such as printed circuit boards ("PCB").

With respect to their construction, the TO packages often include a cylindrical metallic base, also known as a header, with a number of conductive leads extending completely through, and generally perpendicular to, the base. The size of the base is often sized to fit within a specific TO standard size and lead configuration, examples of which include a TO-5 or TO-46. The leads are usually hermetically sealed in the base to provide mechanical and environmental protection for the components contained in the TO package, and to electrically isolate the conductive leads from the metallic material of the base. Typically, one of the conductive leads is a ground lead that may be electrically connected directly to the base.

Various types of electrical devices and optical components, such as the photodiode or laser device, are mounted on an interior portion of the base and connected to the leads to enable their operation. Generally a cap, also known as a can, is used to enclose the interior portion of the base where such electrical devices are mounted so as to form a hermetic chamber that helps prevent contamination or damage to the devices. The specific design of the TO package depends on the optoelectronic component being mounted on the base and the modular component with which the TO package will be used. By way of example, in applications where the optoelectronic component mounted on the base is an optical component, i.e., a laser or photodiode, the cap is at least partially transparent so as to allow an optical signal generated or received by the optical component to be transmitted to or from the TO package. These optical TO can packages are also known as window cans.

In the case of mounting optical components within a window can or other TO package within an optical subassembly, various challenges are often encountered. One challenge deals with accurately positioning the optical component, such as a laser or photodiode, with respect to another component, such as the lens, which may be included in, or proximate to, the package in the optical subassembly. Such positioning is critical to ensure that the optical signals are properly collimated or otherwise focused upon entry to or exit from the optical transceiver module or related device.

In light of the above, a need exists for a means by which a laser, photodiode, or other semiconductor and/or optoelectronic component can be properly positioned in an optoelectronic or other package such that operation of the device in which the component is disposed is optimized.

BRIEF SUMMARY

The present invention has been developed in response to the above and other needs in the art. Briefly summarized, embodiments of the present invention are directed to An optoelectronic package that employs a spacer tool system to properly align an optical component within the device is disclosed. In one embodiment, the package includes a mounting surface, and an optical component positioned on the mounting surface at a predetermined distance from a reference point. The optical component is positioned at the predetermined distance by a spacer tool, wherein the spacer tool is interposed between the optical component and a spacer tool mount during optical component positioning. The spacer tool is of a length that corresponds with the predetermined distance between the optical component and the reference point.

In another embodiment, a method of positioning a first component with respect to a second component in an optoelectronic package is disclosed. The method includes determining a desired position of the first component with respect to the second component, then determining an amount of spacing between the first component and a reference point that is required to position the first component at the desired position. A spacer tool that has a length equal to the required amount of spacing to position the first component at the desired position is employed, then the first component is affixed at the desired position.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-6 depict various features of embodiments of the present invention, which is generally directed to the alignment of an optical or optoelectronic component, such as a laser die or photodiode, within an optical device in such a way as to simplify both the assembly of the device as well as the manufacture of its constituent parts. This, in turn, can reduce costs associated with the manufacture of optical devices that benefit from the teachings contained herein.

Figure 1:
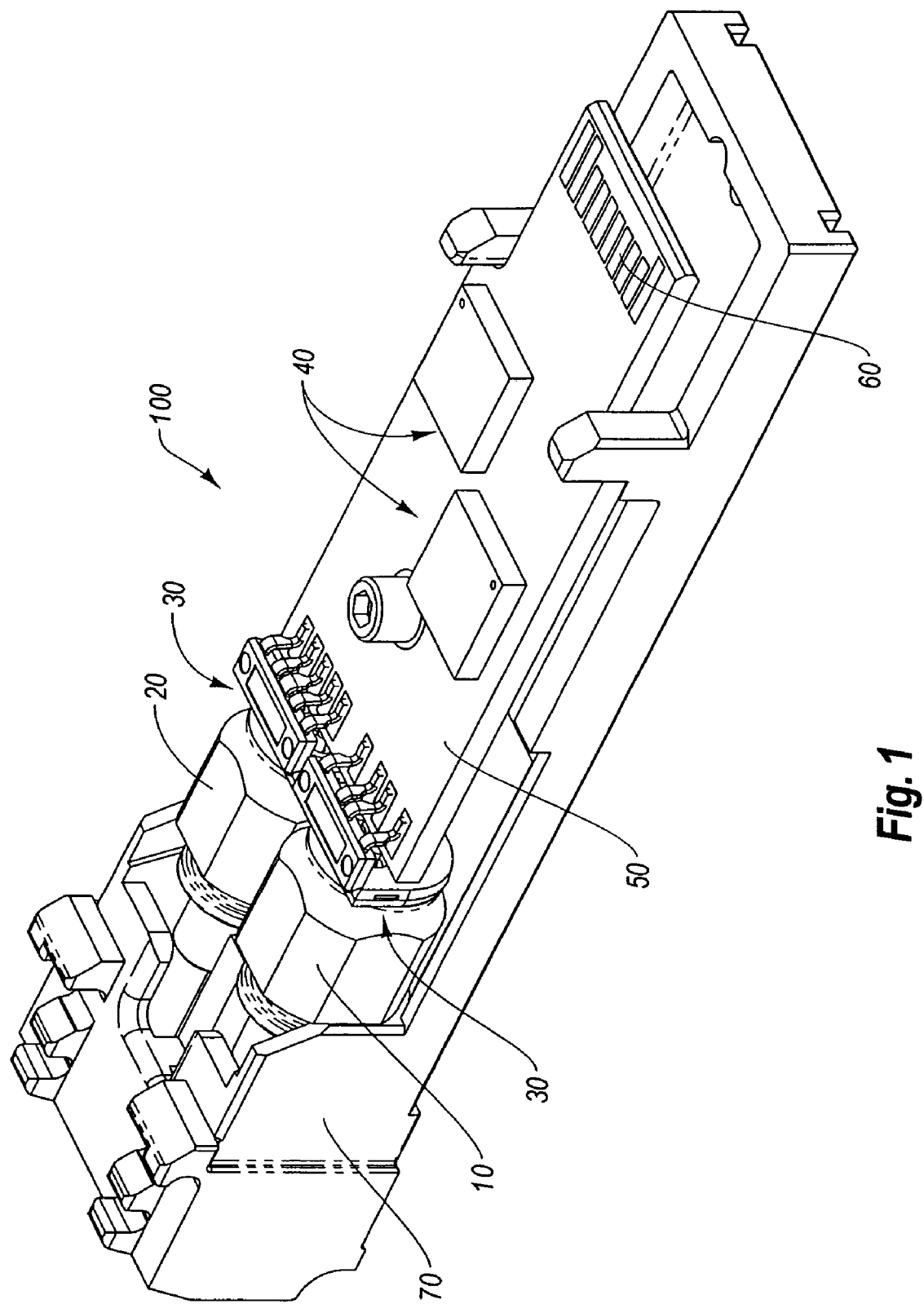
FIG. 1 is a perspective view of an exemplary optical transceiver module, in which one embodiment of the present invention can be practiced.

Reference is first made to FIG. 1, which depicts a perspective view of an optical transceiver module ("transceiver"), generally designated at 100, for use in transmitting and receiving optical signals in connection with an external host that is operatively connected in one embodiment to a communications network (not shown). As depicted, the transceiver shown in FIG. 1 includes various components, including an optical receiver implemented as a receiver optical subassembly ("ROSA") 10, an optical transmitter implemented as a transmitter optical subassembly ("TOSA") 20, electrical interfaces 30, various electronic components 40, and a printed circuit board 50. In detail, two electrical interfaces 30 are included in the transceiver 100, one each used to electrically connect the ROSA 10 and the TOSA 20 to a plurality of conductive pads located on the PCB 50. The electronic components 40 are also operably attached to the PCB 50. An edge connector 60 is located on an end of the PCB 50 to enable the transceiver 100 to electrically interface with a host (not shown here). As such, the PCB 50 facilitates electrical communication between the ROSA 10/TOSA 20, and the host. In addition, the above-mentioned components of the transceiver 100 are partially housed within a housing portion 70. Though not shown, a shell can cooperate with the housing portion 70 to define a covering for the components of the transceiver 100.

Figure 2A:
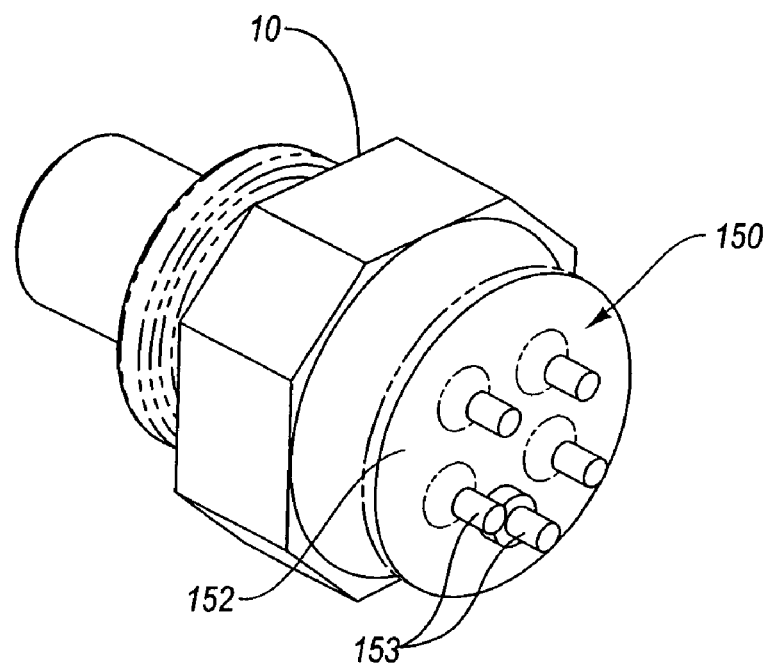
FIG. 2A is a perspective view of an optical subassembly including one embodiment of the present invention.
Figure 2B:
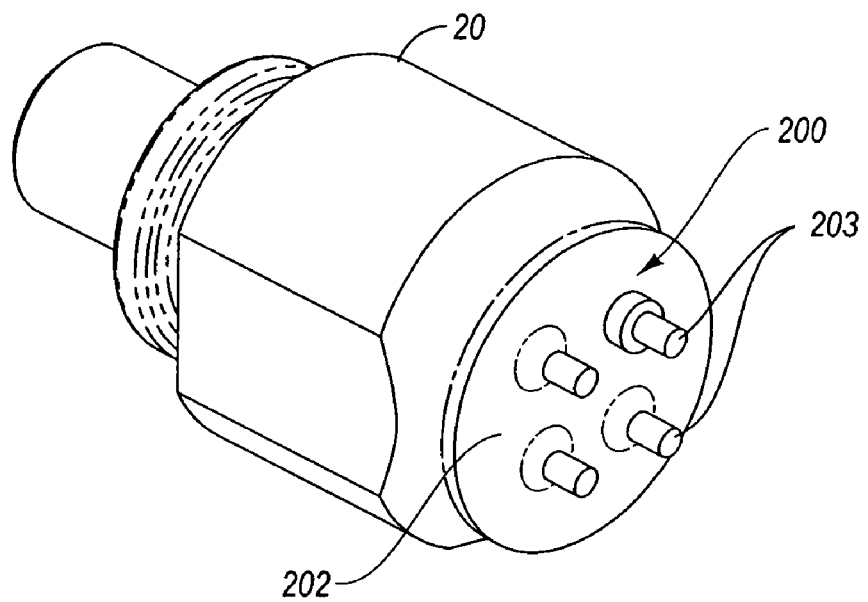
FIG. 2B is a perspective view of another optical subassembly including one embodiment of the present invention.

Reference is now made to FIGS. 2A and 2B. As will be described, the TOSA 20 and ROSA 10 are examples of components within an optical device, such as the transceiver 100, that can benefit from the alignment principles to be discussed herein in connection with embodiments of the invention. In particular, the TOSA 20 generally includes an optoelectronic package that houses a laser die, to be described below, for producing an optical signal in connection with transceiver operation. Similarly, the ROSA 10 includes an optoelectronic package that houses a photodiode (not shown) for receiving an optical signal in connection with transceiver operation. As a prerequisite for their proper operation in transmitting and receiving optical signals, the laser die and the photodiode must be properly aligned with respect to other components within their respective packages. The principles of the present invention provide for such alignment in the direction of light propagation or reception, referred to herein as the z-axis direction (see coordinate axes in FIG. 3).

Notwithstanding the above discussion, it should be remembered that the present invention can be practiced in connection with a variety of other optoelectronic components and optical devices, or with optical subassemblies that vary in structure or design from that depicted herein. Thus, the discussion presented herein should not be construed to limit the present invention in any way.

As mentioned above, the ROSA 10 includes as part of its structure an optoelectronic TO header package ("package") 150 containing one or more optical components. In the present embodiment, the package 150 of the ROSA 10 includes a photodiode (not shown) configured to receive and sense optical signals received by the ROSA for conversion into electrical signals. This configuration is commensurate with use of the ROSA within the transceiver 100.

Similarly, the TOSA 20 includes an optoelectronic TO header package ("package") 200 containing a laser die (not shown here) that is configured to produce an optical signal containing digital data for transmission onto an optical fiber. As such, the packages 150 and 200 serve as examples of an optoelectronic device for use with embodiments of the present invention. In addition, other devices can benefit from the principles contained herein. As such, the features of the ROSA 10 and TOSA 20, together with their corresponding packages, are not necessarily significant to this particular invention, but are provided for purposes of enablement.

In detail, the package 150 of the ROSA 10 includes a base 152 through which extends a plurality of conductive leads 153. Each lead 153 is electrically isolated from the base 152 by glass seals. The leads 153 serve to electrically interconnect components contained in the package 150, such as the photodiode referred to above, with components, supplies, etc., that are located outside of the ROSA 10. In one embodiment, the leads 153 are in electrical communication with the PCB 50 via one of the connectors 30.

Similarly, the package 200 of the TOSA 20 includes a base 202 through which extends a plurality of conductive leads 203, insulated by corresponding glass seals. As with the package 150, the leads 203 of the package 200 serve to electrically interconnect components contained in the package 150, such as the laser die or other light emitter referred to above, with components located outside of the TOSA 20, such as the PCB 50 via one of the connectors 30.

Figure 3:
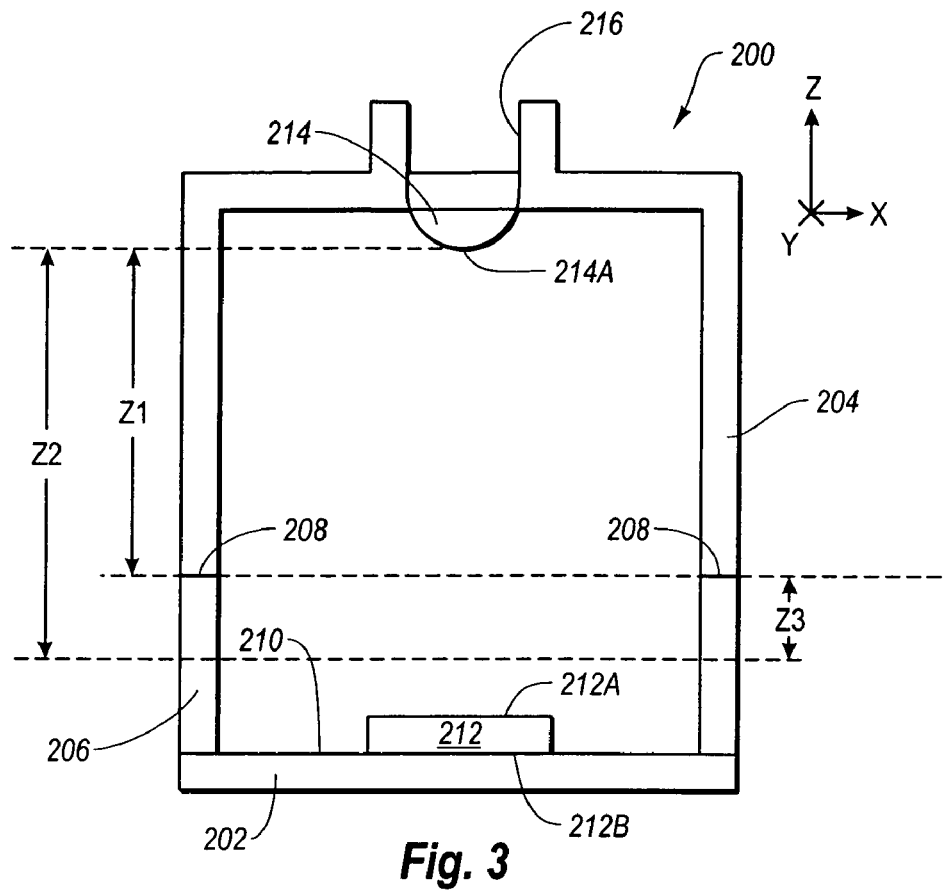
FIG. 3 is a partial cutaway view of an optical package, including a laser die that can be properly aligned in accordance with one embodiment of the present invention.

Reference is now made to FIG. 3 in describing various details regarding one embodiment of the present invention. In detail, FIG. 3 shows, in simplified block form, an optoelectronic package that forms a part of an optical subassembly. In the illustrated embodiment, the package is configured as the laser die-containing housing, or package 200, which forms part of the TOSA 20, as described above. The laser package 200 includes a first package portion 204 and a second package portion 206 that correspondingly mate with one another to form the package. It should be noted that, while it is shown to have a particular configuration, the package 200 is merely representative of the variety of package shapes and configurations in which principles of the present invention can be practiced. For instance, the package could be formed from one, two, or more portions, and the portions could vary in size and design from that which is shown in FIG. 3. Additionally, as has already been described, principles of the present invention can be practiced in connection with other components, such as the ROSA 10 shown in FIG. 2A, or other devices.

As shown in FIG. 3, in one embodiment the first package portion 204 and second package portion 206 are mated with one another at a mating interface of both portions. The mating interface corresponds with a package reference 208 that is defined at the interface of the first and second package portions 204 and 206. The package reference 208 is used in the present embodiment to assist in aligning an optical component of the laser package 200 using the alignment procedures described below. Note that, though the package reference 208 of the embodiment shown in FIG. 3 is defined by the interface between the first package portion 204 and the second package portion 206, other package references could be defined in addition to or instead of the one shown here.

The package 200 further provides a location for the positioning and placement of an optical component. Specifically, FIG. 3 shows a mounting surface 210 defined on the base 202 of the second package portion 206. Alternatively, the mounting surface could be defined on a submount that is attached or defined by the base or second package portion, or another suitable surface. The mounting surface 210 is suitably shaped to receive an optoelectronic component of the laser package 200. In the present embodiment, the optoelectronic component is a laser die 212. FIG. 3 shows the laser die 212 temporarily resting on the mounting surface 210 before being permanently affixed thereto via an adhesive in a manner to be described below. As such, the mounting surface 210 serves as a permanent base for the laser die 212. Note that the mounting surface 210 can have a variety of shapes and configurations in accordance with the needs of the package. For instance, a lead frame, flexible circuit, PCB, etc. can be positioned to interconnect with the laser die 212 via wire bonds or other suitable means once the die is permanently affixed.

The first package portion 204 includes a focusing element, such as a lens 214. The lens 214 is positioned adjacent an outlet 216 that enables an optical signal produced by the laser die 212 and focused by the lens to exit the laser package 200. As such, the laser die 212 and the lens 214 are aligned with respect to one another and with respect to the outlet 216. In another embodiment, the lens can be positioned as a component separate from the package 200.

In the configuration shown in FIG. 3, the laser die 212 is a vertical cavity surface emitting laser ("VCSEL"), and as such emits light from an emitting surface 212A that is substantially parallel to the mounting surface 210. Thus, optical signals emitted by the emitting surface 212A of the VCSEL laser die 212 in this embodiment propagate in the z-axis direction as indicated by the coordinate axes in FIG. 3. Note that other lasers and light emitting semiconductors, such as LED's and edge-emitting lasers, can also be used in connection with embodiments of the invention, as appreciated by one skilled in the art.

In the configuration of the laser package 200 shown in FIG. 3, several pertinent dimensions can be defined in the z-axis direction in order to provide data for the proper z-axis alignment of the laser die 212 in accordance with embodiments of the present invention. A distance between an optical input side 214A of the lens 214 and the package reference 208 is defined as a distance Z1. An optimum distance between the emitting surface 212A of the laser die 212 and the input side 214A of the lens 214 in the z-axis direction is designated Z2. And a dimension Z3 defines the distance between the package reference 208 and the emitting surface 212A of the laser die 212 at the after the laser die is desirably positioned at the optimum distance Z2.

As shown in FIG. 3, the emitting surface 212A of the laser die 212 may be at a level that is initially below the optimum distance from the lens input side 214A, indicated at Z2, after initial assembly of the laser package 200 is complete. Embodiments of the present invention are designed to eliminate this discrepancy in order to provide optimum laser die-to-lens spacing in the z-axis direction. Again, though the present embodiment shows a laser die and a lens, other optoelectronic and optical components can be desirably aligned using the principles of the present invention, including photodiodes associated with a receiver optical subassembly.

Figure 4:
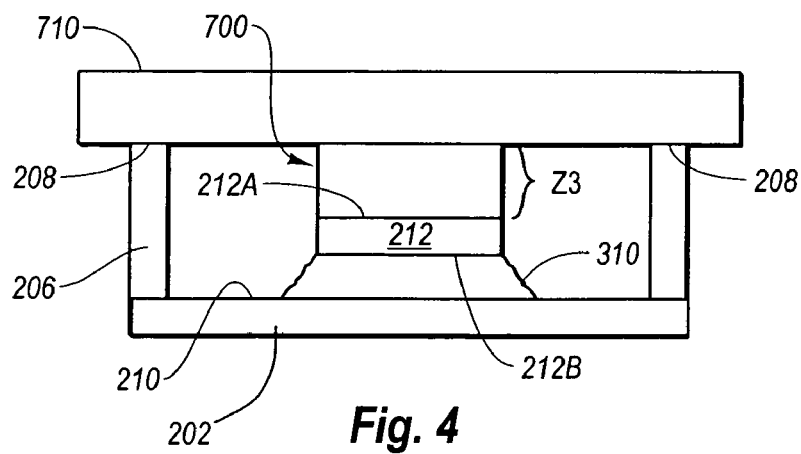
FIG. 4 shows the optical package of FIG. 3, having the laser die desirably positioned in accordance with one embodiment.

Reference is now made to FIG. 4, which depicts use of a spacer tool, generally designated at 700, in properly aligning in a z-axis direction an optical device in a package, such as the laser die 212 in the laser package 200. As such, FIG. 4 is a successive view of the laser package 200 of FIG. 3, following application of alignment procedures of the present invention in accordance with one embodiment thereof. As shown, the laser die 212 is affixed to the mounting surface 210 of the second package portion 206 via an adhesive 310, which can further include solder, adhesive strips, or other suitable affixing means. Placement of the laser die 212 on the mounting surface 210 via the adhesive 310 is such that its emitting surface 212A is positioned a desired distance Z2 from the input side 214A of the lens 214. Advantageously, the distance Z2 between the laser die 212 and the lens 214 represents an optimum orientation in the z-axis direction of the laser die with respect to the lens.

As previously mentioned, alignment of the laser die 212 shown in FIG. 4 is accomplished by detailed measurement of the various dimensions of the laser package 200 and associated components indicated by dimensions Z1-Z3, and by employing the spacer tool 700. In detail, after initial assembly of the laser package 200 and temporary placement of the laser die 212 on the mounting surface 210 of the second package portion 206, the laser package is inspected using a suitable method or device or method to determine the values of the various dimensions Z1-Z3 that are shown in FIG. 3. This can be accomplished using an imaging camera or other optical or physical measurement apparatus. In one embodiment the dimension Z3 can be determined by subtracting the value of Z1 from the value of Z2. In another embodiment, however, Z3 can be optically measured independently of other measurements. Similarly, dimension Z2 can be determined independent of the other dimensions, or can be determined using dimensions or techniques beyond those discussed herein, as appreciated by those skilled in the art.

Determination of Z1 and Z2 enables in turn the determination of the desirable alignment and positioning of the laser die with respect to the direction of light propagation, i.e., the z-axis, within the package 200. The desired position with respect to the package reference 208 is indicated in FIG. 3 as dimension Z3, and in one embodiment is determined by the formula $Z3=Z2-Z1$. As such, dimension Z3 can be considered to define the ideal z-axis position of the laser surface with respect to reference surface 208 to ensure that the laser surface will be positioned at a distance Z2 from lens surface 214A. Any error in the starting position of the laser surface can therefore be corrected by use of the spacer tool 700. It is further noted here that consideration should be made in determining and using the various dimensions noted herein of any additional discrepancy that may be introduced by the thickness of typical adhesive that is used to bond the first and second package portions 204 and 206 together at their mutual interface, in this case, the package reference 208. Note, however, that in the present embodiment only the second package portion is directly employed during the alignment procedures to be described below.

Figure 5:
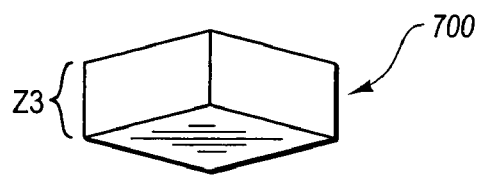
FIG. 5 is a perspective view of a spacer tool that is employed in aligning the laser die of FIG. 3.

As FIG. 4 illustrates, once the dimension Z3 is determined, a spacer tool, such as spacer tool 700 shown in FIG. 5, is selected, having a corresponding length equal to the Z3 dimension, as shown. FIG. 5 shows one example of the spacer tool 700, which in the present embodiment is block-shaped. The spacer tool 700 is attached to a mount 710 that can interface with the package reference 208. As such, during package assembly the laser die 212 is temporarily attached to the spacer tool 700, which in turn is attached to the mount 710. Such temporary attachment can be achieved via adhesive, a vacuum configuration, or other suitable means.

The mount 710 is then brought into contact with the package reference 208 of the second package portion 206. This brings the laser die 212 into proper z-axis alignment with respect to the package reference 208. A sufficient amount of adhesive 310, previously placed on the mounting surface 210 of the second package portion 206, affixes the laser die 212 in place. The mount 710 and spacer tool 700 can remain in place until the adhesive is sufficiently hardened or until the laser die is sufficiently affixed in place. In one embodiment, an epoxy is employed as the adhesive 310 such that, once the laser die 212 is properly positioned in the adhesive, the epoxy can be flash cured, thereby securing the laser die in place.

The mount 710 together with the spacer tool 700 are then removed from the second package portion 206, and assembly can continue as needed to complete the package. So configured, the emitting surface 212A of the laser die 212 is desirably aligned the distance Z3 from the package reference 208 in the z-direction.

It is relatively common that during package manufacture the relative sizes and fit of the respective components of each package can vary from package to package, due to tolerances and other manufacturing variances that are inherent in the manufacturing and assembly process. For instance, one package; such as the package 200 shown in FIG. 2, can possess dimensions Z1 and Z2 that vary from those dimensions of a subsequent package manufactured using the same process. Embodiments of the present invention are designed to compensate for this and other similar variance. In detail, multiple spacer tools can be configured to correspond to packages having varying Z3 distances. Thus, once the needed dimension Z3 is determined for a particular package (FIG. 3), a spacer tool having a corresponding Z3 distance (FIGS. 4, 5) can be selected and used with the mount 710 to properly position the laser die within the package. In this way, z-axis alignment of the optoelectronic component can be achieved regardless of the spacing needs encountered within the package. This in turn enables the components of the package to be manufactured with relatively less strict tolerances than would otherwise be required, thereby reducing overall manufacturing and assembly costs and providing production cost savings to the manufacturer.

Figure 6:
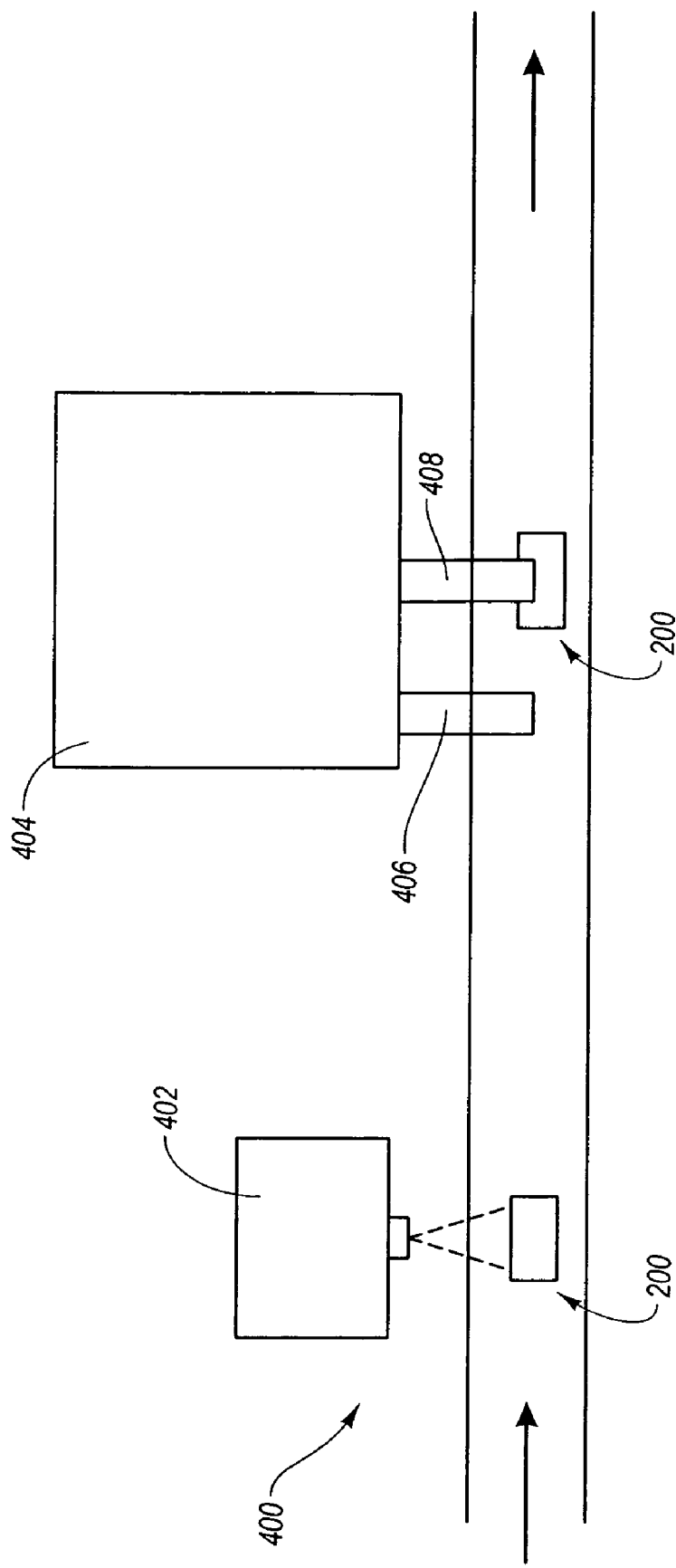
FIG. 6 is a simplified block diagram of a system for positioning an optoelectronic component, such as the laser die of FIG. 3, to a package, according to one embodiment.

Together with FIGS. 3-5, reference is now made to FIG. 6, which shows various details of one embodiment of a process by which optoelectronic components can be properly aligned within a package. Note, however, that FIG. 6 and the accompanying description depicts only certain details of the above process, and is not meant to include an exhaustive enumeration of a method for manufacturing an optical package. Further, principles of the present invention can be practiced using methods and components that vary from that to be described below. The following discussion should not, therefore, be construed as limiting of the present invention.

In detail, FIG. 6 shows a plurality of packages, such as the package 200 shown in FIG. 3, in a manufacturing and assembly process conducted in part by an alignment system 400. As depicted, in one embodiment the laser package 200 can be imaged by an optical measurement device of the system 400, such as a camera 402. The camera 402 is equipped to image portions of the laser package 200 in order to ascertain the dimensions Z1 and Z2 as detailed above, and as shown in FIG. 3. Once the proper dimensions have been ascertained by the camera 402 or similar device and the dimension Z3 has been determined as above, the laser package 200 can proceed to a spacer tool handler 404.

In one embodiment, the spacer tool handler can contain multiple, differently-sized spacer tools having a range of unique Z3 dimensions that correspond to the range of possible desired Z3 dimensions that can be encountered in the package 200, according to the tolerances of the package manufacturing process. Thus, the system 400 can adequately align the laser die 212 within the laser package 200 by first ascertaining the need for proper spacing via the determination of the various dimensions Z1 and Z2, then selecting the proper spacer tool from the spacer tool handler 404.

Once the proper spacer tool is selected, an adhesive applicator 406 or other suitable component administers the adhesive 310 to the proper portion of the laser package 200, such as the mounting surface 210 of the second package portion 206. A spacer tool applicator 408 or other suitable component can be used to temporarily attach the laser die 212 to the spacer tool 700 and insert the spacer tool within the package such that the laser die is positioned at the proper package location in the adhesive 310. Curing of the adhesive 310 can then occur to affix the laser die 212 in the adhesive in a spaced-apart arrangement with respect to the mounting surface at the proper height within the laser package, as desired. The spacer tool 700 can then be removed and the laser package 200 can proceed as needed for further processing steps.

It is to be noted that the details of the system 400 are merely exemplary, and thus should not be construed as the only manner in which principles of the present invention can be practiced. It should also be remembered that, while the present discussion has focused on the placement of a laser die within a laser package, embodiments of the present invention can be practiced with a variety of optoelectronic components and packages, such as photodiodes placed within ROSA packages, for instance. Thus, this and other applications are contemplated as falling within the claims of the present invention.

One advantage related to embodiments of the present invention is the fact that the practice of actively aligning the optoelectronic component in the z-axis direction within the package can be reduced or eliminated, thereby representing further cost savings in the manufacture of the package.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An optical subassembly, comprising:
   a package that defines a mounting surface; and
   an optoelectronic component attached to the mounting surface with adhesive and including either an emitting or reception surface located at a predetermined z-axis distance from a reference point, the predetermined z-axis distance being substantially equal to an overall length of an associated spacer tool that is not a permanent element of the optical subassembly, and a thickness of the adhesive being a distance from the mounting surface to the reference point reduced by the predetermined z-axis distance and a thickness of the optoelectronic component.

2. The optical subassembly as defined in claim 1, wherein the package includes a first package portion and a second package portion, a lens being attached to the first package portion, and the second package portion defining the mounting surface to which the optoelectronic device is attached, the optoelectronic device being arranged for optical communication with the lens.

3. The optical subassembly as defined in claim 1, wherein the adhesive is selected from the group consisting of glue, solder, and adhesive strips.

4. The optical subassembly as defined in claim 1, wherein a lens is included in the package, the lens being arranged for optical communication with the optoelectronic device, and wherein the predetermined z-axis distance is based upon a distance extending from the lens to the reference point.

5. The optical subassembly as defined in claim 1, wherein the mounting surface for the optoelectronic component is defined on a submount of the package.

6. The optical subassembly as defined in claim 1, wherein the package includes a first package portion and a second package portion, and wherein the reference point is defined at a mating interface of the first and second package portions.

7. The optical subassembly as defined in claim 6, wherein one of the package portions defines the mounting surface.

8. The optical subassembly as defined in claim 1, wherein the predetermined z-axis distance is dependent on characteristics of the particular package.

9. The optical subassembly as defined in claim 1, wherein the optical subassembly comprises a ROSA.

10. The optical subassembly as defined in claim 1, wherein the optical subassembly comprises a TOSA.

11. The optical subassembly as defined in claim 1, wherein the optoelectronic component comprises an optical transmitter.

12. The optical subassembly as defined in claim 1, wherein the optoelectronic component comprises an optical receiver.

* * * * *